May 26, 1970     H. D. BOULTINGHOUSE     3,513,507

MOLDING OF CELLULAR STRUCTURES

Filed Oct. 25, 1967

INVENTOR.
H. D. BOULTINGHOUSE
BY Young & Quigg
ATTORNEYS

United States Patent Office 3,513,507
Patented May 26, 1970

3,513,507
MOLDING OF CELLULAR STRUCTURES
Harold D. Boultinghouse, Bartlesville, Okla., assignor to Phillips Petroleum Company, a corporation of Delaware
Filed Oct. 25, 1967, Ser. No. 678,091
Int. Cl. B29f *1/00;* B29d *23/02*
U.S. Cl. 18—30                          6 Claims

ABSTRACT OF THE DISCLOSURE

Cellular structures are molded by extruding an expandable thermoplastic material from a point near the axis of a mold cavity and in a radial direction from that axis toward the periphery of the cavity. The extruding point is initially near one end of the cavity, but is moved along the axis of the cavity as the cavity is filled with a predetermined deposit of the thermoplastic material. The extrusion occurs, for example, from a radial nozzle tip into a movable mold which is slidably mounted over an elongated extrusion nozzle carrying the radial nozzle tip.

---

Figure 1:
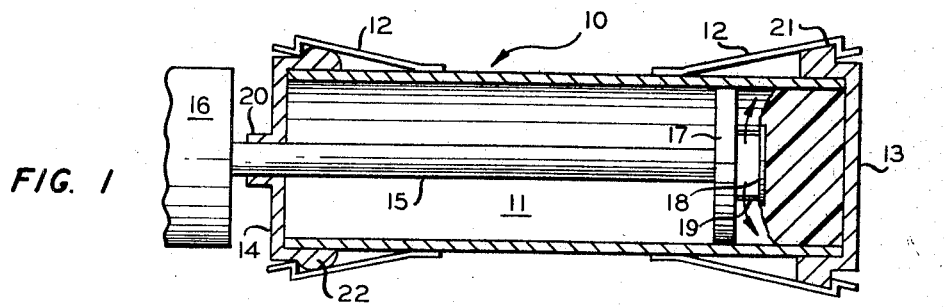

This invention relates to molding of cellular structures. In another aspect, this invention relates to a novel apparatus for molding cellular structures.

Cellular material made from inducing cell or void formation in thermoplastic material before the setting thereof has the desired characteristics of low density and the resultant light weight, good heat insulation, and high durability. This material has been utilized as electrical and heat insulating material, bottle corks, light weight handles for tools, and containers of various sorts.

According to a recently disclosed cellular molding technique, a thermoplastic material is initially plasticized under heat and pressure. Then, an expanding medium is thoroughly admixed into the plasticized thermoplastic material while the temperature and pressure are maintained such that substantially no cells are formed in the mass. Next, the material is extruded from a nozzle into a mold, the outer surface of the extrudate becoming sufficiently cooled to form a closed but extensible layer without setting the interior of the mass. Finally, because of reduced pressure in the mold, the expanding medium causes the extrudate to swell within the extensible layer to thereby conform to the shape of the interior of the mold. This expansion causes cells or voids within the interior of the mass to form; consequently, as the interior of the mass is cooled and set, a relatively low-density thermoplastic object will result.

When the extrusion is carried out by the use of a single nozzle which is withdrawn from a mold as the mold is filled, many times the mold will not be filled evenly. This is particularly true when a relatively small sized nozzle is used to fill a relatively large size mold. This uneven filling results in a molded object with a non-uniform cell structure after the extrudate has expanded and set.

One object of this invention is to provide a novel apparatus for molding cellular structures.

Another object of this invention is to provide a novel apparatus for uniformly filling a mold with expandable thermoplastic material.

According to one embodiment of this invention, a method of filling a mold with expandable thermoplastic material is provided whereby the mold can be filled evenly and uniformly and thereby result in uniform cell structure in the molded object. According to my novel method, cellular structures are molded by extruding expandable thermoplastic material from a point near an axis of the mold cavity, e.g., the longitudinal axis of an elongated mold zone, and in a radial direction from that axis toward the periphery of the cavity. Initially, the extruding point is near one end of the cavity, but is moved along the axis of the cavity as it is filled.

According to another embodiment of this invention, an apparatus for molding cellular objects is provided.

According to still another embodiment of this invention, an apparatus for molding hollow objects of cellular material is provided.

This invention can be more easily understood from a study of the drawing in which FIGS. 1–14 illustrate the method of this invention and the apparatus of this invention in various stages of operation. FIG. 5 illustrates another embodiment of this invention suitable for producing hollow objects.

Figure 2:
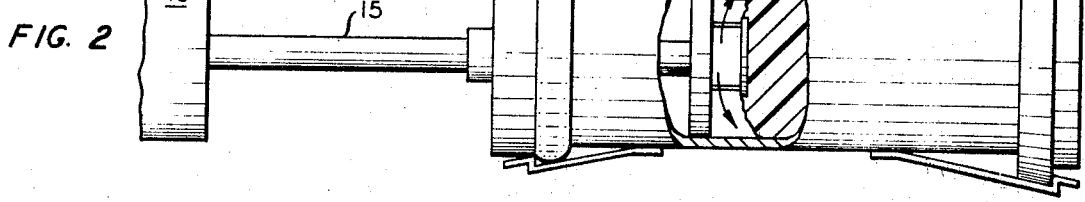
Figure 3:
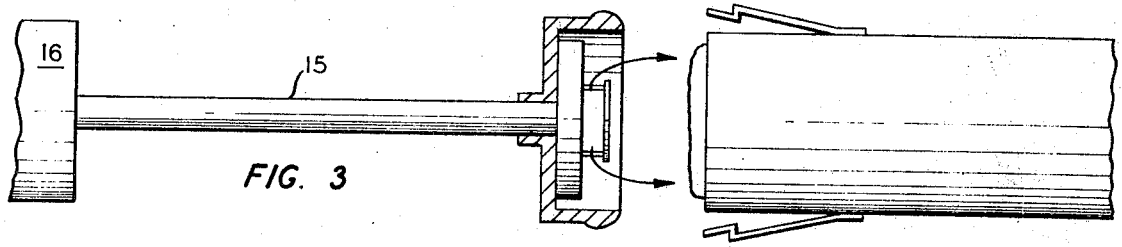

Now, referring to FIGS. 1–3, an elongated mold 10 comprises a mold body 11 which carries spring clips 12 for securing end closures 13 and 14 thereto. Mold 10 is illustrated as an elongated body with a mold cavity having a substantially constant cross-sectional configuration and area along its length. Any desired cross-sectional configuration such as square, round, oval, rectangular, triangular, or cross can be used. However, it must be understood that mold 10 need not have a substantially constant cross-sectional configuration and area along its length, but can have any desired configuration such as for tool handles, toys, decoys, etc. Also, mold 10 can be a sectional mold having at least two mold sections fastened together by suitable means such as locking latches and locking bolts, and having one open end to be fitted with end closure 14.

Mold 10 having end closure 13 secures thereto is fitted over elongated extrusion nozzle 15 which is attached to extruder 16. Pressure flange 17 is attached to nozzle 15 adjacent the outlet end thereof as illustrated in FIGS. 1–3. Baffle plate 18 is attached to pressure flange 17 by spacer rods 19 and serves to direct the flow of thermoplastic material from nozzle 15 radially toward the periphery of the mold cavity. End closure 14 is slidably mounted on nozzle 15 at point 20 by suitable means such as bushings and the like. End closure 14 is thereby free to slide along nozzle 15 between extruder 16 and pressure flange 17. It is noted that spring clips 12 engage locking shoulders 21 of end of closure 13 and can only be disengaged by lifting spring clips 12 from locking shoulders 21. However, when mold 10 is fitted over extrusion nozzle 15 as illustrated in FIG. 1, spring clips 12 adjacent the open end thereof will contact and lock with rounded shoulders 22 of end closure 14. Spring clips 12 can be disengaged from rounded shoulders 22 either by lifting spring clips 12 upwardly therefrom or by internal pressure being exerted by pressure flange 17 on end closure 14.

When mold 10 has an internal cavity with a substantially constant cross-sectional configuration and area over its length, it is preferred that the outer periphery of pressure flange 17 have a configuration which is substantially identical with but slightly smaller in size than the cross-sectional configuration of the mold chamber in mold 10. However, if the cross-sectional configuration and area of the cavity of mold 10 is not substantially constant, pressure flange 17 can be any desired size and shape, but it is generally preferred that the average diameter of pressure flange 17 be only slightly smaller than the average radial diameter of the mold cavity in mold 10.

The presence of pressure flange 17 will result in more uniform deposit of extrudate in the mold even if my novel radial delivery nozzle is not used in conjunction therewith. However, it is preferred that the pressure flange and the radial nozzle be used together.

Extruder 16 is preferably the extrusion device illustrated and described in British Pat. 1,018,178. In its operation, a screw (not shown in FIGS. 1–3) is mounted for continuous rotation within a heated extruder barrel and thoroughly admixes thermoplastic material with a suitable expanding material and then transports the resulting admixture to nozzle 15. The interior of the extruder barrel within extruder 16 is maintained under sufficient pressure to substantially prevent cells from forming in the admixture of thermoplastic material and expanding material during the mixing and transporting operation. Any suitable thermoplastic material can be utilized such as polymers and/or copolymers and mixtures of 1-olefins having from 2 to 8 carbon atoms, for example, polyethylene, polypropylene, polybutene, and copolymers thereof. A suitable expanding material that can be used in the operation of this invention is ammonium carbonate.

In the operation of this invention, mold 10 is slipped over extrusion nozzle 15 until spring clips 12 engage rounded shoulders 22 of end closure 14. Mold 10 can either be supported solely by bushings or the like at point 20 and/or pressure flange 17, or it can be at rest on a solid surface, or even be mounted on suitable sliding means such as rails and the like. Extruder 16 supplies molten expandable thermoplastic material to extended nozzle 15. This molten thermoplastic material travels from nozzle 15 and is deflected by baffle 18 radially toward the periphery of mold 10 as illustrated by the arrows in FIGS. 1 and 2. This action provides for a more uniform delivery of the molten expandable thermoplastic material to the interior of mold 10 and prevents mold packing in the lower portions of the mold due mainly to the force of gravity, and resultant void formations in the upper portions of the mold cavity.

As the mold fills, the force of the entering thermoplastic material against pressure flange 17 and baffle 18 results in mold 10 moving to the right as illustrated in FIG. 2. When the mold fills, pressure flange 17 will contact end closure 14 and thereby cause spring clips 12 to move upward on rounded shoulder 22 and disengage therewith as illustrated in FIG. 3. Mold 10 can then be removed by hand or by any suitable mechanism and end closure 13' (FIG. 4), which is identical to end closure 13 can be snapped onto the open end of the mold to assure that the expansion of the thermoplastic material within the mold will completely fill the mold cavity. At this time, a new molding cycle can begin by slipping a new mold 10 over extrusion nozzle 15 as described above.

If desired, the mold filling operation can be accomplished by separating extruders 16 and mold 10 at any predetermined rate rather than allowing the pressure of the entering thermoplastic material to slide mold 10 along fixed nozzle 15. This can be accomplished either by moving extruder 16 and/or mold 10 at any desired rate. The radial delivery of the thermoplastic material by nozzle 15 will assure that the mold cavity is filled uniformly during this movement.

FIG. 5 is an illustration of another embodiment of this invention which is suitable for producing hollow objects made of cellular thermoplastic material. As illustrated, end closure 13 has been replaced by end closure 23 which has insert 24 slidably mounted therethrough. Insert 24 can be any suitably shaped elongated body being at least as long as the mold cavity in mold 10. Latching means 25 are carried by the leading end of insert 24 and lock with baffle 18 when contacted therewith. Thus, as the mold cavity fills, mold 10 is moved away from extruder 16 as illustrated in FIG. 3, and insert 24 extends throughout the length of the mold cavity. After the mold is filled, spring clips 25 are disengaged and a second closure mechanism 23 is inserted on the open end of mold 10 with the leading end of insert 24 extending therethrough. The thermoplastic material is then allowed to expand and cool in a manner as heretofore discussed.

Figure 4:
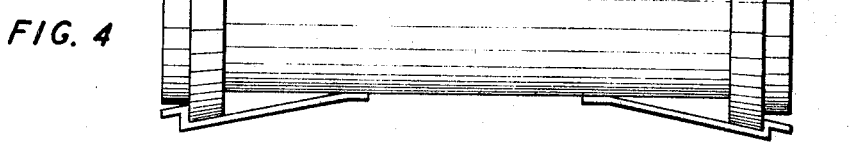
Figure 5:
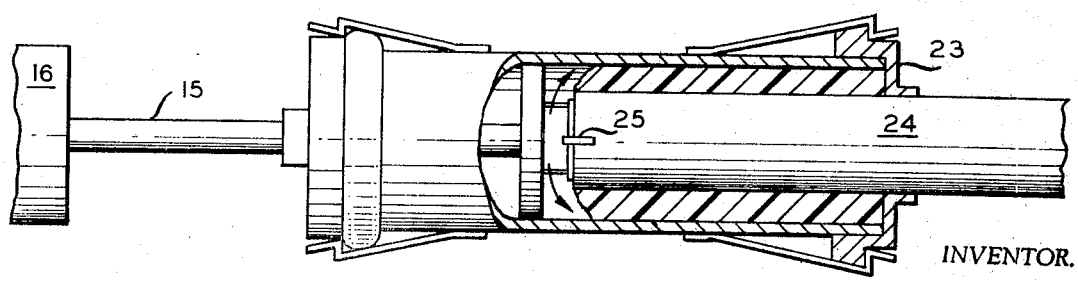

The finished objects can be removed from the closed mold (as illustrated in FIG. 4) by removing end closures 13 and 13' and pushing the formed object from the mold. If an opened ended split mold, as herebefore described, is used, the end closure 13' or 23 is removed, the mold is split into the corresponding mold pieces such as, for example, two mold halves, and the formed object is removed.

Although this invention has been described with respect to its preferred embodiments, it should be understood that many variations and modifications will now be obvious to those skilled in the art, and the above-described preferred embodiments are in no way intended to limit the scope of this invention.

I claim:
1. A molding apparatus comprising:
 (a) an extruder means;
 (b) an elongated extrusion nozzle means operatively connected to said extruder means;
 (c) at least one mold means comprising an elongated mold chamber with one open end and one closed end and having an internal configuration of the object to be molded, said mold being adapted to move axially relative to said nozzle;
 (d) an outwardly extending flange means positioned about and attached to the end of said nozzle adjacent the discharge opening thereof;
 (e) a removable closure means for the open end of said movable mold, said closure means positioned in slidable contact on said nozzle between said extruder means and said flange means and adapted to close the open end of said mold when said flange and said discharge opening are positioned in said chamber; and
 (f) latching means to hold said closure means against said open end until a predetermined pressure is exerted against said closure means by said flange means.

2. The apparatus of claim 1 further comprising a baffle means affixed to said nozzle adjacent said discharge opening for directing thermoplastic material radially from the axial direction of thermoplastic material flow from said discharge opening.

3. The apparatus of claim 1 wherein said movable mold means comprises an elongated chamber having a substantially uniform cross-sectional configuration and area throughout its length.

4. The apparatus of claim 3 wherein the outer perimeter of said flange means has a configuration which is substantially identical to but slightly smaller in size than the cross-sectional configuration of said mold chamber.

5. The apparatus of claim 1 wherein the closed end of said mold comprises a second removable closure means held in locking engagement over the end of said mold by second latching means.

6. The apparatus of claim 5 wherein said second removable closure means has an elongated insert body movably positioned therethrough, said insert body adapted to be extended throughout the length of said mold chamber, the leading end of said insert body having fastening means for coupling said leading end with said baffle.

References Cited
UNITED STATES PATENTS

| | | |
|---|---|---|
| 873,559 | 12/1907 | Koontz. |
| 2,280,022 | 4/1942 | Banigan et al. |
| 2,961,716 | 11/1960 | Luenberger _____ 25—38 XR |
| 3,122,786 | 3/1964 | Huisman _____ 25—38 XR |
| 3,259,682 | 7/1966 | Neville et al. |
| 3,306,960 | 2/1967 | Weissman et al. |

WILLIAM J. STEPHENSON, Primary Examiner

U.S. Cl. X.R.

18—12